United States Patent
Huang et al.

(10) Patent No.: US 12,244,625 B2
(45) Date of Patent: *Mar. 4, 2025

(54) APPLICATION LAYER DATA PROTECTION FOR CONTAINERS IN A CONTAINERIZATION ENVIRONMENT

(71) Applicant: SUSE LLC, Pleasant Grove, UT (US)

(72) Inventors: Fei Huang, San Jose, CA (US); Gang Duan, San Jose, CA (US); Zang Li, San Jose, CA (US)

(73) Assignee: SUSE LLC, Pleasant Grove, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,539

(22) Filed: Aug. 20, 2023

(65) Prior Publication Data

US 2023/0412628 A1    Dec. 21, 2023

Related U.S. Application Data

(63) Continuation of application No. 16/019,368, filed on Jun. 26, 2018, now Pat. No. 11,792,216.

(51) Int. Cl.
| | | |
|---|---|---|
| *H04L 9/40* | (2022.01) | |
| *G06F 9/455* | (2018.01) | |
| *H04L 41/22* | (2022.01) | |
| *H04L 43/06* | (2022.01) | |

(52) U.S. Cl.
CPC ...... *H04L 63/1425* (2013.01); *G06F 9/45558* (2013.01); *H04L 41/22* (2013.01); *H04L 43/06* (2013.01); *G06F 2009/45591* (2013.01); *H04L 63/168* (2013.01)

(58) Field of Classification Search
CPC . H04L 63/02; H04L 63/0209; H04L 63/0236; H04L 63/0245; H04L 63/0254; H04L 63/0263; H04L 63/14; H04L 63/1408; H04L 63/1416; H04L 63/1425; H04L 63/168; H04L 41/22; H04L 43/06; G06F 2009/45587; G06F 2009/45591; G06F 9/45558
See application file for complete search history.

(56) References Cited

U.S. PATENT DOCUMENTS

| | | | | |
|---|---|---|---|---|
| 10,447,720 B1* | 10/2019 | Evans | ............... | H04L 63/0428 |
| 2002/0169871 A1* | 11/2002 | Cravo de Almeida | | ...................... H04L 43/0817 709/224 |
| 2014/0194094 A1* | 7/2014 | Ahuja | .................. | H04W 4/029 455/410 |
| 2015/0143120 A1* | 5/2015 | Barton | ................. | H04W 12/08 713/168 |

(Continued)

*Primary Examiner* — Jeremy S Duffield

(57) ABSTRACT

A container system monitors one or more activities of an application container in a container system by intercepting data from the one or more activities of the application container. The application container includes computer-readable instructions and initiated via a container service and isolated using operating system-level virtualization. The monitoring is performed at a layer between the app container and the container service. The container system also transmits a report of the intercepted one or more activities to a designated source. The container system inspects the intercepted one or more activities, and in response to the intercepted one or more activities violating a policy in a policy store, triggers an action specified in the policy.

23 Claims, 5 Drawing Sheets

(56) References Cited

U.S. PATENT DOCUMENTS

| | | | |
|---|---|---|---|
| 2015/0186621 A1* | 7/2015 | Uy | G06F 21/109 |
| | | | 726/26 |
| 2016/0105396 A1 | 4/2016 | Hastings | |
| 2016/0373251 A1 | 12/2016 | Kumar | |
| 2017/0093923 A1* | 3/2017 | Duan | G06F 11/2028 |
| 2018/0176189 A1* | 6/2018 | Paul | H04L 43/20 |
| 2018/0278639 A1* | 9/2018 | Bernstein | G06F 21/53 |
| 2019/0342315 A1* | 11/2019 | Smelov | H04L 43/06 |

* cited by examiner

APPLICATION LAYER DATA PROTECTION FOR CONTAINERS IN A CONTAINERIZATION ENVIRONMENT

FIELD OF ART

The disclosure generally relates to the field of network containerization, and specifically to application layer data protection for application containers running on a containerization platforms.

BACKGROUND

A recent development in networked infrastructure is the container model. In the container model, a kernel of an operating system (e.g., Linux) allows for multiple isolated user-space instances, or "containers," executing simultaneously. Each container is isolated from other containers, and may access a set of resources that are isolated from other containers. Each container also interacts with a container service, which may provide various functions, such as an application programming interface (API) to allow each container to access various functions of the container service (e.g., establishing communications, communicating with other containers, logging). One advantage of such a container system is the ability of the container system, with the assistance of the container service, to quickly and transparently migrate containers between hardware servers during live operation, e.g., for load balancing. Another advantage is that, since virtual emulation of resources, such as in a virtual machine (VM) environment, is not being performed to provide resources to the containers, the overhead compared to a VM-based environment is much lower.

However, such container systems, data protection becomes a major challenge. When application containers perform activities, such as transmit data, both between application containers and to external sources, these activities are obfuscated by the container system when viewed from a traditional network security appliance. For example, transmitted network data may be encrypted and/or encapsulated by the container system (on top of the encryption by the application itself) before being transmitted out of the container environment and into the local network. Stored files may be presented as binary blobs with encrypted structure as well. A traditional network security appliance or other data monitoring system would have no visibility into the activities performed by such application containers due to this obfuscation. Therefore, what was lacking, inter alia, were systems and methods for monitoring application activities within a container environment to effectively enforce data security and other policies.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments herein disclose a method in a container system for monitoring, by an intercept container, one or more activities of an application container in a container system by intercepting data from the one or more activities of the application container. The application container includes computer-readable instructions and initiated via a container service and isolated using operating system-level virtualization. The intercept container configured at a layer between the app container and the container service.

The intercept container also transmits a report of the intercepted one or more activities to a designated source. The intercept container inspects the intercepted one or more activities, and in response to the intercepted one or more activities violating a policy in a policy store, triggers an action specified in the policy.

Example Intercept Container and Container Environment

Figure 1:
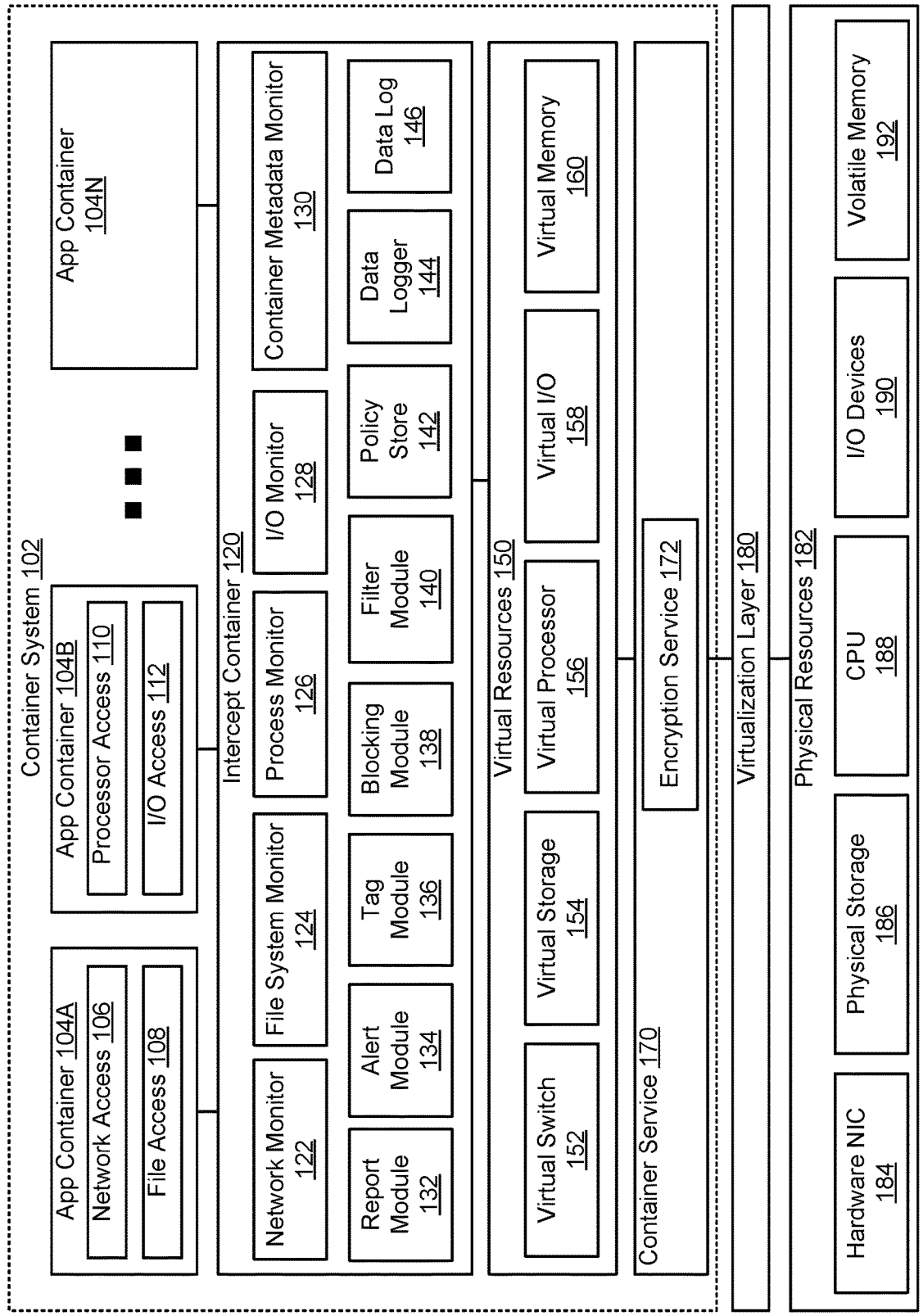
FIG. 1 illustrates an example of an intercept container to monitor application container activity in a container system, according to an example embodiment.

FIG. 1 illustrates an example of an intercept container 120 to monitor application container activity in a container system 102, according to an example embodiment. FIG. 1 illustrates a simplified view of a container system 102. Some elements, such as separate servers, a local network, and so on, are omitted for sake of clarity. These elements are described in further detail with regards to FIG. 3. The container system includes one or more application ("app") containers 104A-N, an intercept container 120, one or more virtual resources 150, and a container service 170. The container system 102 may execute on a virtualization layer 180, which is coupled with one or more physical resources 182.

Container System

The container system 102 is an operating system (OS) level virtualization environment whereby various "containers," execute on a shared set of hardware resources. For example, a container may be an instance of a user-space process executing on a resource isolated instance within an OS. Alternatively, the container may itself host multiple processes, each sharing the resources of that container. Each container has access to a set of virtual resources, such as the virtual resources 150. However, the container does not have direct access to the physical resources, e.g., physical resources 182 of the underlying hardware. The underlying hardware may include one or more computing devices, such as servers. Each computing device may include one more processors, I/O, network interface devices, physical storage, and so on. However, the actual configuration and function of these computing devices is not visible to any of the containers in the container system 102. Instead, a container service, such as container service 170, configures the aforementioned virtual resources 150 for each container. The virtual resources 150 may not be shared between each container, so that each container may see its own set of virtual resources. The virtual resources 150 may also not correspond directly with the physical resources 182, e.g., the amount of memory in the physical resources 182 may not correspond to the amount of memory available in the virtual resources 150 to a container. Furthermore, physical resources 182 amongst multiple computing devices may be combined or aggregated by a container service 170 and presented as the virtual resources 150. The container system 102 as illustrated in FIG. 1 is a simplified view of the components of a container system. Additional details of components that may be used in a container system 102, including supporting services, etc., are described with further detail below with regards to FIG. 3.

An advantage of such a container system 102 is that the physical resources of the container system 102 are removed from the allocated virtual resources 150 of each container. Each container is also isolated from other containers in the container system 102, increasing security. Scalability may also be improved, containers can be easily added and removed without having to be customized for a specific physical resource layout. Other advantages may also be present in a container system 102. For example, when the same data is accessed by different containers, only the data portions that varies between the containers may have different instances. The data that is the same is not duplicated, thus saving space. The container system 102 may also use less resources than a full virtualization environment, as the OS level virtualization in the container system 102 does not necessarily require the execution of a separate guest OS with its own kernel within each container and the precise emulation of all hardware components for that guest OS to execute.

However, a disadvantage to the container system 102 is in the area of data monitoring and security. As will be described in further detail below, the container service 170, which processes data from the containers, such as the app containers 104A-N, typically encrypts data from the app containers 104, and may encapsulate or split apart the data as well. Furthermore, the processes that are executed within the app containers 104 are typically not visible outside the container or outside the container system 102. Therefore, any app container activity, which includes the network traffic, I/O activity, process activity, file access activity, and so on, are obfuscated when viewed outside the container system 102. Therefore, a security appliance or gateway sitting within the local network, but outside the container system 102, as would be the case in a traditional enterprise system, would have very little visibility within the container system 102. Such a traditional security gateway would not have proper means of determining whether sensitive data, or other activity that is against a policy, is being performed by the app containers 104A-N, whether maliciously or inadvertently (e.g., due to a bug). This issue is solved by the installation of the intercept container 120 within the container system 102. As described in further detail below, the intercept container 120 is able to monitor the activities of the app containers 104 within the container system 102 in order to report upon, and trigger actions upon, any monitored activity of the app containers 104 prior to the activities being obfuscated.

App Containers

The app containers 104A-N (or app containers 104) are containers executing within the container system 102. As noted above, containers, such as the app containers 104, are isolated instances executing with OS level virtualization within an operating system. The operating system may execute with a single kernel, which provides the necessary environment to each of the app containers 104. However, each app container 104 is isolated from other containers within the container system 102, and cannot see the resources used by the other app containers 104. Therefore, each app container 104 cannot share processes with other app containers 104, and instead communicate similarly to processes running on separate OS s and/or separate machines, e.g., by network communication, etc.

Each app container 104 may perform multiple activities, including, but not limited to, network access 106, file access 108, processor access 110, and I/O access 112. Note that although different activities are illustrated within different app containers 104 in FIG. 1, this does not mean that each app container 104 is limited to these activities. Furthermore, each app container 104 may perform additional other activities, such as graphical processing unit (GPU) access, and so on.

Network access 106 may include, but is not limited to, transmitting and receiving network data, including network packets, using various network protocols, such as TCP/IP, UDP, VPN, and so on, by processes executing in each app container 104. For example, an app container 104 may execute processes related to a web server, and may create open network sessions, listen on certain network ports, respond to requests from clients, and so on. Network access 106 may utilize virtual resources 150 such as a virtual switch 152.

File access 108 may include, but is not limited to, access to flat files, databases, and so on. For example, an app container 104 may access customer data in a database (e.g., a SQL database). File access 108 may utilize virtual resources 150 such as virtual storage 154.

Processor access 110 may include, but is not limited to, general utilization of processor cycles, processor cache, and so on, from the execution of various computer-readable instructions (e.g., machine instructions in the instruction set of the supported processor). Processor access 110 may also trigger the use of volatile memory, as data may be loaded into the volatile memory during the execution of the computer-readable instructions. Processor access 110 may utilize virtual resources 150 such as the virtual processor 156 and the virtual memory 160.

I/O access 112 may include, but is not limited to, bidirectional transmission of data and/or instructions to input/output devices, such as the virtual I/O 158 of the virtual resources 150. I/O devices may include any type of device, virtual or otherwise, that may allow information or communication to be transmitted to or from an environment external to the computing environment of the container system 102. For example, I/O devices may include displays, input devices (e.g., touchscreens, keyboards, mice, various sensors).

Note that although the app containers 104 are shown to be within a monolithic container system 102, in practice they may be spread among multiple hardware devices, multiple operating system instances, and/or multiple virtual machines. These are not shown here for clarity of illustration.

Intercept Container

The intercept container 120 monitors the various activities performed by the app containers 104, reports on these activities, and may trigger various actions if certain monitored activities violate some policy set for the app containers 104. The intercept container 120 itself may be a container within the container system 102, but may have elevated privileges (e.g., unrestricted kernel space access) in order to intercept or monitor the activities of the app containers 104. The intercept container 120 may be able to intercept data, such as data related to file access 108, network access 106, and I/O access 112, before that activity reaches the virtual resources 150. The intercept container 120 may also be able to monitor activity directly within each app container 104, such as monitoring processor access 110, by utilizing various application programming interface (API) or other operating system tools and commands. This monitoring may be performed by the network monitor 122, file system monitor 124, process monitor 126, and I/O monitor 128. The intercept container 120 may also capture container management and configuration metadata using the container metadata monitor 130. In addition, the intercept container 120 may include a report module 132 to report any monitored data, as well as trigger one or more actions if the monitored activity violates any policies in the policy store 142. These actions may be performed by the alert module 134, tag module 136, blocking module 138, filter module 140, and so on. The information captured by the various monitors 122-130 may be logged by the data logger 144 and stored in the data log 146. Although the intercept container 120 is described here as a container in the container system 102, in other embodiments it may be a sidecar container or an agent inside an app container (e.g., operating within a server-less environment).

The network monitor 122 captures information about network-based activity of the app containers 104. The network-based activity is activity from the app containers 104 that involves the virtual switch 152 and which may be external from the app container 104 itself. As noted above, this may include transmission of network data, such as packets, using various network protocols, opening of sessions, listening for incoming data, and so on. The network data may be encrypted, encapsulated, or otherwise modified from a plaintext format by an app container 104 before being transmitted to the virtual switch 152.

The network monitor 122 may capture the entirety of all network data that is sent or received by the app container 104, or only partial data, such as header information, of the network data. The network monitor 122 may perform this capturing of the network data using various techniques, such as packet sniffing, deep packet inspection, system call monitoring, etc. The network monitor 122 may also gather metadata of the network traffic, such as the number of packets, amount of data (e.g., in megabytes), data throughput rate, data transmission for each time slice of a day (week, or month), most used data protocols, most used data ports, most common destinations, data traffic statistics per destination, and so on. The network monitor 122 may also use other tools to monitor and network related activity data and metadata, such as executing network monitoring tools for the app container 104 (e.g., netstat, tcpdump), and capture data that is generated by these tools.

In one embodiment, the data transmitted or received in the network-based activity from an app container 104 is encrypted. In such a case, the network monitor 122 may receive an encryption key from the app container 104, or from the process monitor 126, which may retrieve the encryption key by, e.g., inspection of the working memory of the app container 104 to scan for an encryption key.

Periodically, or in real time, the network monitor 122 may transmit the captured data and metadata to the other modules of the intercept container 120. These other modules may store the data, e.g., in the case of the data logger 144, report the data, e.g., in the case of the report module 132, or perform some action due to some pattern or other characteristic of the data or metadata triggering a policy violation. For example, the alert module 134 may generate an alert to transmit to a system administrator upon determining that a network activity for an app container 104 violates a policy indicating which destinations the app container 104 is allowed to transmit.

The file system monitor 124 captures information about file system activity of the app containers 104. The file system activity may include any activity generated by the app containers 104 that involves reading to or writing from the virtual storage 154. Such file system activity may include, but is not limited to, reading and writing from a database (e.g., a SQL database), accessing a flat file, writing to a log file, setting or retrieving file attributes, repositioning files, deleting files, creating files, loading computer-readable instructions, and so on. The file system monitor 124 may also capture metadata for the file system activity, including but not limited to the timestamp of each access, rate of access, throughput of access, access count for different data sources, and so on.

The file system monitor 124 may capture this information by monitoring calls to access the virtual storage 154. These may be system calls that are executed by processes within the application container 104. For example, the "creat(2)" syscall in Linux is used to create a file in the file system. The file system monitor 124 may monitor these system calls using subsystems presented by the operating system. For example, in Linux, the file system monitor 124 may utilize the audit subsystem (with the auditd daemon) to monitor syscalls (e.g., as specified in the auditctl configuration file). The file system monitor 124 may read the audit log and determine which syscalls have been made to access the file system, and capture the files that are accessed and/or metadata regarding the file accesses. As another example, the file system monitor 124 may use strace in Linux in order to monitor file access system calls. The file system monitor 124 may also monitor file system accesses by periodically checking the virtual storage 154 to see if any data on the virtual storage 154 has changed. Such changes, and/or the metadata regarding these changes, may also be captured. The file system monitor 124 may also use other tools to monitor and capture file system activity data and metadata, such as executing file system monitoring tools (e.g., lsof, iotop), and capture data that is generated by these tools.

As with the network monitor 122, the file system monitor 124 may periodically or in real time transmit the captured data and/or metadata to the other modules within the intercept container 120 for logging, reporting, or to take action if some characteristic of the data and/or metadata violates a policy for the app container 104.

The process monitor 126 captures information about process-related activity within the app containers 104. The process-related activity may include any activity by the app containers 104 in consuming processor cycles of the virtual processor 156, causing the virtual processor 156 to execute computer-readable instructions, loading, storing, and removing data into the virtual memory 160, and so on. Specifically, the process-related activity may include, but is not limited to initializing processes, initializing threads, calling library functions, calling API functions, system calls (e.g., load, execute, wait, allocate memory, create process, end process, abort, etc.), inter process communication, resource locks (e.g., semaphores), executing computer-readable instructions, registers accessed, and memory access.

The process monitor 126 may also capture metadata of this process-related activity, including, but not limited to a number of threads/processes opened, process names, thread names, executable file names, names of library calls, names of API calls, parameters passed, number of registers used, amount of memory utilized, processer usage over time, and processor usage per thread/process.

To capture this data, the process monitor 126 may monitor system calls in a similar fashion to the file system monitor 124 (e.g., with an audit subsystem), but for system calls related to process activity (e.g., load, execute, create process, fork process, terminate process, set process attributes, allocate memory, etc.). The process monitor 126 may also analyze the computer readable instructions of a process directly, whether by directly accessing the computer readable instructions stored in the virtual storage 154, or stored within the call (program) stack that is loaded into memory, e.g., virtual memory 160. The process monitor 126 may also use other tools to monitor and capture process data and metadata, such as executing process and resource monitoring tools (e.g., top, vmstat, htop), and capture the data generated by these tools.

As with the other monitors described above, the process monitor 126 may periodically or in real time transmit the captured data and/or metadata to the other modules within the intercept container 120 for logging, reporting, or to take action if some characteristic of the data and/or metadata violates a policy for the app container 104.

The I/O monitor 128 captures information related to input/output (I/O) activity for app containers 104. The I/O activity may be related to any data passed between an app container 104 and the virtual I/O 158. The virtual I/O 158 may represent any I/O device. Therefore, the I/O monitor 128 monitors activity such as communication between the app container 104 and user I/O devices (e.g., keyboards, mice, touchscreens), displays, optical disc drives, and other devices capable of providing input from and delivering output to the external world to the app container 104.

The I/O monitor 128 may capture the data that is transmitted between the app container 104 and the virtual I/O 158 by monitoring system calls to address space reserved for I/O devices, monitoring interrupt requests from I/O devices, monitoring device driver activity (e.g., the memory space for a device driver), and so on.

As with the other monitors described above, the I/O monitor 128 may periodically or in real time transmit the captured data and/or metadata to the other modules within the intercept container 120 for logging, reporting, or to take action if some characteristic of the data and/or metadata violates a policy for the app container 104.

The container metadata monitor 130 captures metadata for the container system 102. This metadata may include configuration information for the container system 102 as a whole, as well as information related to each app container 104. Configuration information for the container system 102 may include, but is not limited to, number of nodes, network address allocation, cluster names, security model used, binary version number, security certificate information, and list of users/credentials. Information for each app container 104 may include, but is not limited to, virtual resources (e.g., virtual memory size) allocated for that app container 104, system privileges for that app container 104, and app container 104 namespaces.

The container metadata monitor 130 may capture this information using the APIs provided by the container service 170. These may include various RESTful (Representational State Transfer style complaint) APIs provided by the container service 170. The container metadata monitor 130 may query the information by executing calls using the API to the container service 170. The container metadata monitor 130 may then report this information to the other modules of the intercept container 120, e.g., to be logged, reported, or for an action to be taken on that information.

The report module 132 generates reports based on information captured by the various monitors 122-130. The reports may be generated as standalone packages that are periodically or on-demand transmitted to a designated recipient, such as a sysadmin (e.g., via email), or generated in a user interface (UI) and updated in real time, e.g., on a web page. The contents of the report may include the actual data that is captured, metadata that is captured, an indication of whether any policy is violated, what actions were taken due to the policy violation, and so on. The report may be organized by app container, virtual resource, or other category. If a UI is used to present the report, the report module 132 may generate a UI that can be searched, filtered, present data hierarchically (e.g., using a breadcrumb menu), and so on. Access to certain parts of the report may be restricted by credentials access (e.g., username and password), due to the potentially sensitive nature of some of the data presented. If a violation of a policy is detected (by one of the other modules 134-140), the report module 132 may include in the report the policy that was violated, and the action that was taken in response to the policy violation.

The report module 132 may also include in the report historical data regarding any of the captured information. This may be retrieved from the data log 146.

The alert module 134 triggers an alert when a policy is violated by an app container 104 and the prescribed action for that violation is an alert action. The alert module 134 periodically, or in real-time, analyzes the information captured by the monitors 122-130. If this information violates a policy in the policy store 142 that prescribes an alert action, the alert module 134 triggers an alert. The alert may include the full details of the policy violation, such as the app container 104 that performed the violation, the information captured in relation to the violation, etc., or it may include an indication or link to a report generated by the report module 132 regarding the violation. The alert module 134 may transmit the alert to a predefined contact address, such as an email address or instant message address of a system administrator.

The tag module 136 applies one or more tags to the captured information that is monitored by any of the monitors 122-130, and specified by a policy in the policy store 142. A tag is any type of indicator. The tag module 136 tags any information that is specified by a policy. For example, a policy could indicate that any changed sectors, files, database blocks, etc., in the virtual storage 154, as monitored by the file system monitor 124, is to be tagged by the tag module 136. This may allow a backup program to backup only newly tagged sections in the virtual storage 154. Another policy may instruct the tag module 136 to remove tags to data that has been backed up. The tag may be linked by the tag module 136 directly with the respective information at the original location of that information in the virtual resources (e.g., as a file attribute, header information, process attribute, etc.), or associated with the information as recorded in the data log 146. The tag module 136 may also transmit a notification of all tagged information to a predefined contact, such as the sysadmin described above for the alert module 134. The tag module 136 may tag information in real time, or on a periodic basis. The tags may also be included in the reports that are generated by the report module 132.

The blocking module 138 blocks any activity captured by the monitors 122-130 which is forbidden by a policy in the policy store. The blocking module 138 may block different activity using different methods. For network-related activity, the blocking module 138 may block the connection that has the activity forbidden by the policy (e.g., by refusing system calls to open connections or send/receive network data). For file system related activity, the blocking module 138 may block access to the file, database, or other file system object indicated by the policy (e.g., by removing access permissions to the file system object, by locking the object). For processor related activity, the blocking module 138 may suspend further execution of the process indicated by the policy, and also freeze access to its memory space (e.g., by using operating system suspend process command, such as "kill—STOP" in Linux). For I/O related activity, the blocking module 138 may remove access for the app container 104 to the I/O device indicated in the policy (e.g., by changing access permissions to the memory space of the I/O device). The blocking module 138 may also block activity from a specific app container 104 by using APIs from the container service 170 to suspend and/or restrict the activity of the app container 104.

The filter module 140 performs modification of data related to activity that triggers a violation in a policy of the policy store 142. The modification of the data may include any type of change to the data. The data is part of the information that is captured by one of the monitors 122-130 in relation to the activity. However, the modification of the data is not to data that has been logged by the intercept container 120, but to data that is being used by the app containers 104. For example, the data may be network packets when the activity to be filtered is network-related activity captured by the network monitor 122. The modification to that data may be to scrub it before it is transmitted. As another example, the data may be a file stored on the virtual storage 154, and the modification may be to encrypt the data as it is written to the storage, and decrypt the data when the app container 104 requests it from the virtual storage 154.

The filter module 140 may perform a different type of modification depending on the activity type. For network activity, the filter module 140 may modify data within outgoing network data by intercepting outgoing network data, modifying the data within the outgoing network data, and sending the modified network data with the same destination address as the unmodified network data. For example, the filter module 140 may scrub sensitive data from outgoing network packets. For file system related activity, the filter module 140 may modify data by modifying the data on the virtual storage 154 that was written by the app container 104. For I/O related activity, the filter module 140 may modify the I/O buffers (e.g., using system calls such as writing to device block files). For processor related activity, the filter module 140 may modify the working memory for the app container 104 to change program instructions or other program data. The filter module 140 may further transmit the changes made to the report module 132 for inclusion in a report.

The filter module 140 determines which data to modify, and what modification to make, using instructions stored in a policy from the policy store 142. The policy will indicate to the filter module 140 the data that is to be identified, and if identified, what types of modifications should be made to the data. Additional details regarding policies are described below with regards to the policy store 142.

The policy store 142 stores one or more policies that provide instructions for the various modules 134-140 in regards what type of monitored activity should trigger an action, what action should be triggered, and how that action should be executed. As defined here, an action is any of the processes that may be performed by the alert module 134, tag module 136, blocking module 138, and filter module 140, in response to a policy indicating that the action should be triggered due to the detection of some monitored activity. Therefore, an action may include, but is not limited to, transmitting an alert, tagging data, blocking an activity, or filtering data. As noted above, the monitored activity is any type of activity that may be performed by the app container 104, and can include network, file system, process, and I/O related activity.

A policy indicates what activity, if detected in the container system 102, will trigger an action. This activity may include the capture of certain data or metadata by one of the monitors 122-130. When a certain data or metadata is captured that matches a template in the policy, the action specified in that policy is triggered and/or executed.

A template provides an indication of the observed data and/or metadata. When the observed metadata or data matches the indication in the template, or matches it to a threshold degree of similarity, the action for the corresponding policy is triggered. For observed data, a template can indicate a data structure, data values, and any of the other data described above for any one or a combination of the monitors 122-130. For observed metadata, a template can indicate metadata values, such as network source/destination, throughput values, and any of the other metadata described above for the monitors 122-130. The template can indicate a fixed value, or may change over time based on historical data. For example, the template may indicate data representing a previous state of data on a virtual storage. By matching the indicated data and/or metadata in a template, either with an exact match or a threshold similarity match, the action (or actions) indicated in the corresponding policy for that template is executed by the appropriate one or more of the modules 132-140. In some cases, a match to a template occurs when the data does not match the data indicated in the template. Such an inverse match would be specified in the template as requiring data not to match in order to trigger the corresponding action. The matching against the template may be performed by one or more of the modules 132-140. One or more of the modules 132-140 may perform the matching if it determines that the action for the corresponding policy is an action that is performed by that respective module. Alternatively, a separate module (not shown) may perform the matching of the observed data and/or metadata, that is stored in the data log 146 or received from the monitors 122-130, to the template of a policy, and then submit the corresponding action to the appropriate module for execution of that action, if the template is matched.

To match data and/or metadata indicated in a template, various methods may be employed by the modules 132-140 (or a single module). The template may be specified directly using data and/or metadata values, as noted above, and an exact match may be searched for within the observed data/metadata. A match based on similarity (e.g., td-if) to the data/metadata specified may also be used, rather than an exact match. Alternatively, the template may be specified using other methods. In one embodiment, the template indicates data by specifying regular expressions. The template includes one or more regular expressions, and the observed data/metadata is searched to see if a match exists with the regular expression. The template may indicate some regression curve for multiple data variables, and a match may be found if observed data/metadata over a specified period of time for those data variables matches within a certain deviation of the regression curve. The template could include other methods of matching, such as cluster data, a tree, Baysian matching, a combination of the above methods, and so on. With all of these types of templates, the template indicates some data or metadata, and the matching of that template causes the associated action to be triggered.

The templates specified above may also be matched to observed data/metadata that is divided into buckets of data/metadata. These buckets may be generated by one or more of the module 132-140 when performing the matching of the data to the template. Each bucket may be generated from the observed data/metadata using different categories, such as periods of time, app containers, destination, activity type, etc. For example, buckets may be generated that each have data from a different day of the week. The template may indicate different data/metadata for each bucket, and if data within each bucket matches the template, then the corresponding action is triggered. Otherwise, no action is triggered.

A period of time categorization divides the observed data/metadata into buckets with data/metadata from periods of time, such as hours, weeks, time of day, day of the week, or other period. A categorization by app container divides the observed data/metadata by the app container that is causing that data/metadata to be generated. A categorization by destination divides the data/metadata into buckets according to any destination of that data, e.g., network destination, file vs network vs I/O, etc. An activity categorization categorizes the observed data/metadata according to the activity/monitor that caused the data/metadata.

The template could also indicate data/metadata using deep learning. The template may include a machine learning algorithm, e.g., a recurrent neural network, which is trained upon a baseline of normal activity, using monitored data from the monitors 122-130. The machine learning algorithm is subsequently fed live data, and it determines a score indicating how similar the live data is to the baseline normal activity data. If that score exceeds a threshold, then the associated action may be triggered. The features input into the machine learning algorithm may include both data and some metadata associated with that data, such as timestamps for the data. Certain data may be weighted more strongly (e.g., network access may be weighted higher than other accesses due to its more sensitive nature). The data may also be divided into buckets, as described above. The data may also be bucketed based on periods of time, with each time-based bucket fed sequentially into the machine learning algorithm, such that it may learn a temporal pattern in the data.

As noted above, an action is triggered if the template in a policy is matched. The action is specified by the policy, and may be based on the severity of the consequences due to the observed data/metadata matching the template. For example, matches related to network activity may result in stronger actions being taken, compared to matches related to processor activity, which might result in a lower strength action being triggered. As an example, an alert action by the alert module 134 may be an action of low strength, a filter action by the filter module 140 may be of medium strength, and a block action by the blocking module 138 may be of high strength. Policies, that which violated, have legal consequences (e.g., violate legal statute) may also trigger actions of high strength. For example, a policy may indicate that sensitive data, such as credit card information or social security numbers, should not be transmitted by an app container via the virtual switch 152 to any destination. A violation of this policy may trigger a block action of the app container by the blocking module 138.

If the template includes a machine learning algorithm, the action that is triggered may be specified by the policy in relation to the score generated by the algorithm. A higher score may trigger a stronger action. The range of scores may be divided equally into separate ranges, with each range corresponding to an action, and the actions ordered in strength corresponding to the score.

In addition, some policies may simply trigger actions that are used to perform system and other maintenance tasks. For example, a policy may trigger a tagging action (by the tag module 136) for any data that has changed from a previous state, i.e., data that does not match a previously stored indication of data that is indicated in the template. A smart backup tool may subsequently back up data that has been tagged.

Virtual Resources

The virtual resources 150 includes various resources that are abstracted from the physical resources 182 but appear to the app containers 104 to have the same functionality. These may include a virtual switch 152, a virtual storage 154, a virtual processor 156, a virtual I/O 158, and a virtual memory 160. The virtual switch 152 acts as a physical switch, such as a network interface card, router, switch, hub, etc. The virtual storage 154 may be a database, storage drive (e.g., hard drive, solid state drive, SATA/SCSI/NVMe drive), tape drive, etc. The virtual processor 156 may represent a processor with one or more cores. The virtual I/O 158 represents various I/O devices, such as a display, keyboard, etc. The virtual memory 160 represents working memory (e.g., RAM). The virtual resource 150 may include other components not shown here, such as a graphical processing unit. The programmatic interfaces presented by the virtual resources 150 to the processes in the app containers 104 may be the same as with physical resources. Therefore, the virtual resources 150 may act transparently to the app containers 104.

The container service 170, which is described with additional detail with regards to FIG. 3 below, provides various API and other services to enable the containerization of the processes executing in the app containers 104. In particular, the container service 170 may include an encryption service 172 to encrypt data from the virtual resources 150 to the physical resources 182. The encryption service 172 may encrypt, encapsulate, or otherwise manipulate the data in order to prevent malicious users from gaining access to the data. This data may subsequently be decrypted when retrieved from the physical resources 182. Therefore, this encryption operation is transparent to the app containers 104. Not all data may be encrypted, as certain data, such as machine instructions, may not be able to be encrypted without compromising functionality. However, other data, such as file system data and certain network data, may be encrypted without affecting functionality. For example, an app container may request to write a file to the virtual storage 154. The encryption service 172 encrypts this file before transmitting it to the physical storage 186. When the app container 104 retrieves this file, the encryption service 172 decrypts the file and presents it at the virtual storage 154 without encryption. As another example, an app container 104 may transmit network data to another app container 104 on another physical server. The encryption service 172 may encrypt the network data (but not necessarily the header), and transmits this network data using the hardware NIC 184 to the other physical server. An encryption service on that other physical server may decrypt the network data before passing it to the destination app container 104. As noted above, because the intercept container 120 sits between the app containers and the container service 170, it can have direct access to any data from the app containers 104 without having to encounter any encryption or other obfuscation of the data from the container service 170. Therefore, the intercept container 120 can have more visibility into the data compared to a traditional gateway.

Figure 3:
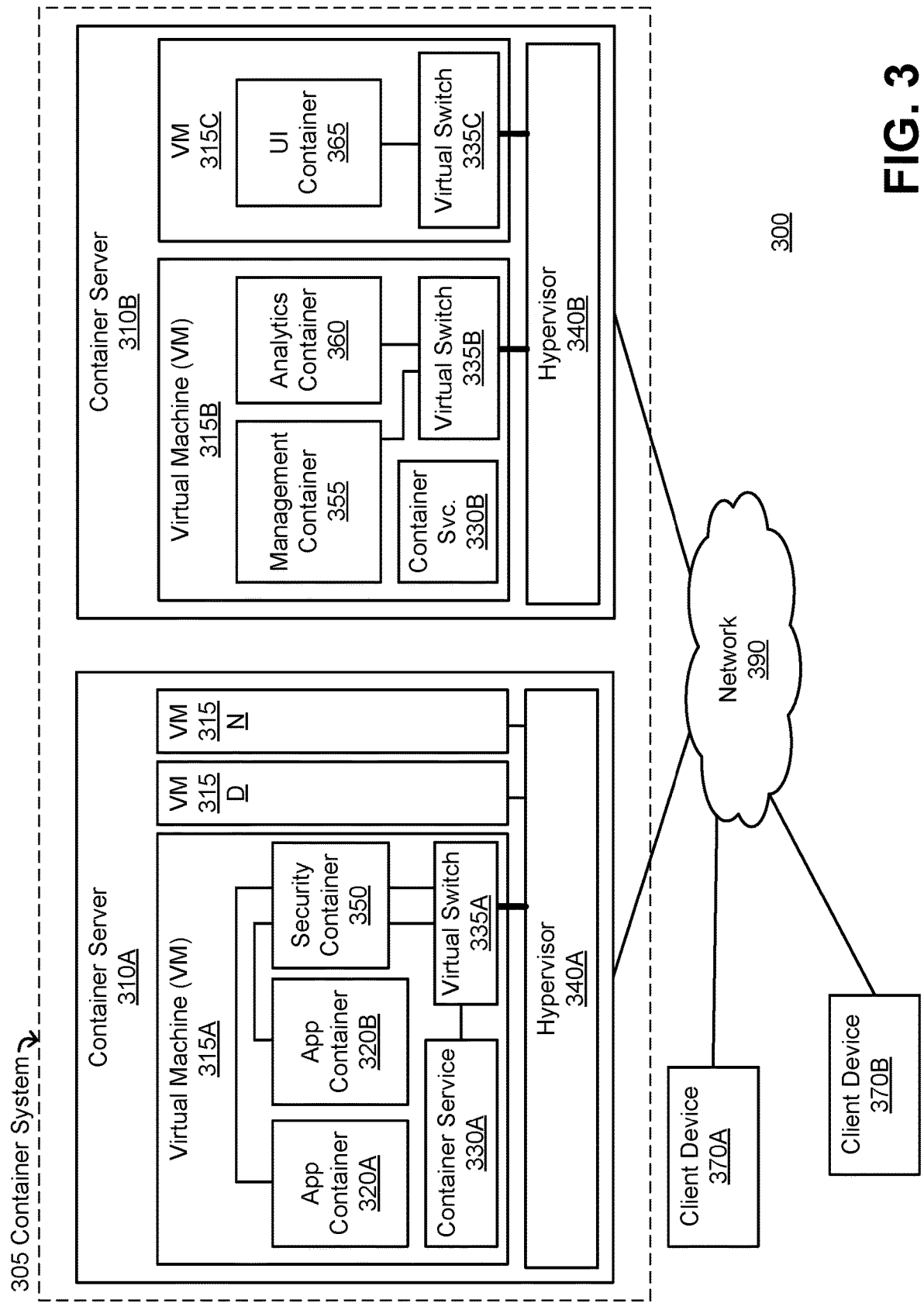
FIG. 3 illustrates an example container environment with an exemplary container architecture in which an intercept container, such as the intercept container of FIG. 1, may operate, according to an embodiment.

The virtualization layer 180, which is described in additional detail in FIG. 3, may be a hypervisor or other component providing virtualization for the container system 102. As noted above, the container system 102 may execute on multiple virtual machines. In such a scenario, the virtualization layer 180 may be a hypervisor or other component that provides the virtualization for the virtual machines. Although the above description shows a virtualization layer 180 and a container service 170, in some embodiments the system does not include a virtualization layer 180.

The physical resources 182 represent actual hardware resources of the one or more physical servers that the container system 102 executes upon. These may include a hardware network interface card (NIC) 184 (e.g., an Ethernet adapter), physical storage 186 (e.g., a magnetic, flash based, tape based, or other storage), CPU 188 (e.g., an x86 multi-core processor), I/O devices 190 (e.g., serial interface cards, printers, keyboards, mice, displays, FPGAs, etc.), and volatile memory 192 (e.g., RAM, ECC DDR DIMMs).

Note that although the above description was described in regards to a container environment, it may also apply to other cloud environments. In these cloud environments, an intercept service similar to the intercept container 120 may be situated at the same level as executable client processes, but have additional privileges in order to view into the client processes in order to monitor data, and for example, prevent the loss of sensitive data external to the network.

Exemplary Interaction Diagram Between App Container and Intercept Container

Figure 2:
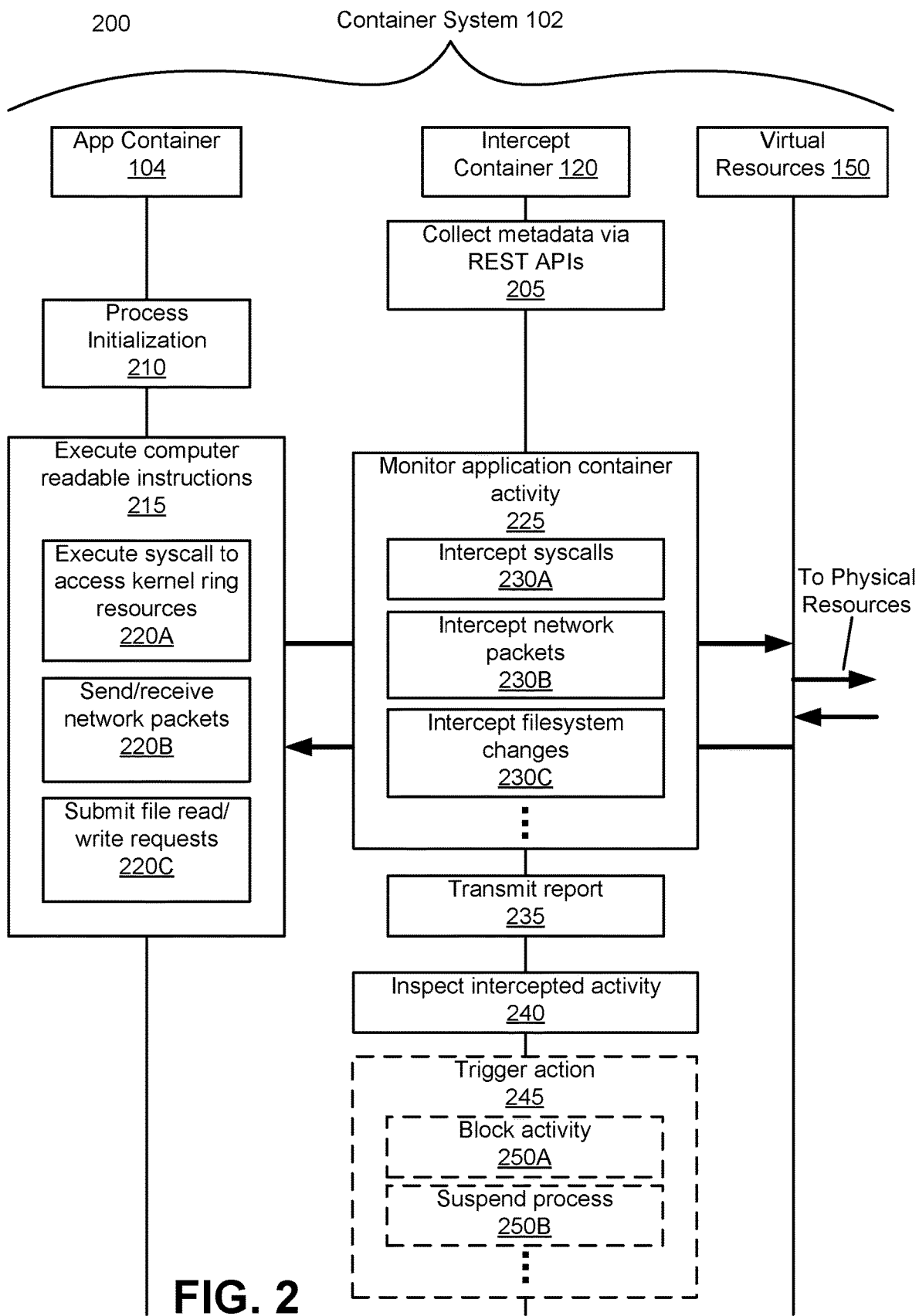
FIG. 2 is an interaction diagram illustrating an exemplary process by which an intercept container monitors, reports, and acts upon monitored activity of an application container, according to an example embodiment.

FIG. 2 is an interaction diagram 200 illustrating an exemplary process by which an intercept container monitors, reports, and acts upon monitored activity of an application container, according to an example embodiment.

The interaction diagram 200 illustrates communication between an app container 104, the intercept container 120, and the virtual resources 150.

At 205, the intercept container 120 may collect 205 metadata regarding the app containers 104, as described previously in FIG. 1 with regards to the container metadata monitor 130. At 210, the app container 104 may initiate a process. This may be any executable process, such as any program code, that is loaded into memory for execution. For example, the app container 104 may start a process that performs the functions of a web server. At 215, the app container 104 executes computer readable instructions related to the initialized process. These may cause the app container 104 to execute 220A syscalls to access privileged resources, such as forking a process. This may also cause the app container 104 to send/receive 220B network packets, as well as submit 220C file read/write requests. Note that sending/receiving network packets and submitting file read/write requests may also require privileged access, and thus require requests to the kernel (e.g., via the kernel ring).

The various accesses described in 220A-C are monitored by the intercept container 120 at 225 and the data/metadata regarding this access 220 is intercepted before it arrives at the virtual resources 150. The intercept container 120 may intercept 230A syscalls, intercept 230B network packets, and intercept 230C filesystem changes. The methods in which such data may be intercepted is described above with regards to the monitors 122-128. The intercept container 120 (periodically or at a later time) transmits 235 a report of the captured data to a designated recipient. Details of how the report is generated and transmitted are described with more detail above with regards to the report module 132. The intercept container 120 also inspects 235 the intercepted activity to see if the captured data/metadata matches a template in a policy of the policy store 142. If any template is matched, the intercept container 120 may trigger 245 an action, such as blocking 250A the activity, suspending 250B the process, and so on. Details of matching of the policy and taking of actions is described with more detail above with regards to the modules 134-140 which trigger actions when they determine that a policy of the policy store 142 is violated.

Example Container Architecture

FIG. 3 illustrates an example container environment 300 with an exemplary container architecture in which an intercept container, such as the intercept container 120 of FIG. 1, may operate, according to an embodiment. The environment 300 includes the network 390, one or more client devices 370, one or more container servers, e.g., 310A, 310B (generally, 310) of a container system 305, with each container server 310 including one or more application ("app") containers, e.g., 320A, 320B (generally 320). A container server 310 also may include a security container 350, a management container 355, an analytics container 360, and/or a user interface (UI) container 365. Although the two illustrated container servers 310A and 310B include different containers, this is not meant to indicate that the container servers 310A and 310B are different. The containers within each container server 310 may be interchangeable, and thus each container server 310 is largely the same. Although the illustrated environment 300 may include the elements shown in FIG. 3, in other embodiments the environment 300 may include different elements. Furthermore, the functionalities of each element may be distributed differently among the elements in other embodiments. In the environment 300, the intercept container, such as intercept container 120, may reside in the security container 350.

The network 390, which can be wired, wireless, or a combination thereof, enables communications among the client devices 370 and the one or more container servers 310 of the container system 305 and may include the Internet, a local area network (LAN), virtual LAN (VLAN) (e.g., with VPN), wide area network (WAN), or other network. In one embodiment, the network 390 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

The client devices 370 are electronic devices used by users to perform functions such as consuming digital content, executing software applications, browsing websites hosted by web servers on the network 390, downloading files, and interacting with the container servers 310. For example, the client devices 370 may be dedicated e-readers, smartphones, wearables (e.g., smartwatches or pendants), or tablets, laptops, or desktop computers configured similar to an exemplary machine (or computing system) described with FIG. 6. A client device 370 may include one or more applications, such as a web browser, to interact with services provided by the container servers 310. Although two client devices 370 are illustrated in FIG. 3, in other embodiments the environment 300 includes more client devices 370.

The container servers 310 are electronic devices that communicate via network 390 and may execute hypervisors, virtual machines (VMs), and one or more containers. Each container server 310 may be located at a different physical location than another container server 310. However, the container servers 310 may communicate with each other via dedicated network links, such as a tunnel. This may allow services on each container server, such as the container services 330, to communicate with each other within a virtual local network. In one embodiment, the container servers 310 include an operating system that enables operating-system-level virtualization, such that the kernel of the operating system allows for multiple isolated user-space instances (i.e., "containers"). In one embodiment, the container servers 310 include an operating system that enables hardware virtualization, which is a method of simulating or emulating a separate set of hardware resources on which a guest operating system or other software to executes. In such a case, the container server 310 may include one or more hypervisors 340 for hardware virtualization, on which one or more virtual machines (VMs) 315 execute. In one embodiment, these hypervisors 340 may be represented by the virtualization layer 180 of FIG. 1.

The hypervisor 340 is a software and/or hardware component executing on the container server 310 that creates and runs the VMs 315. The hypervisor 340 may execute directly on the hardware (e.g., processor, memory, storage, etc.) of the container server 310, may execute on an operating system of the container server 310, or may execute using a hybrid of these two (e.g., in the case of a Kernel-based Virtual Machine (KVM)). The ability to execute multiple VMs on a single hardware platform expands the capabilities of the hardware platform and simplifies management, while improving security. Furthermore, multiple different operating system versions and platforms may execute on each VM, while all using the same hardware platform.

The VMs 315 are emulations of a computer system or hardware platform. Each VM 315 emulates, either fully or partially, a set of hardware resources for a computer system. For example, the VM 315 may emulate a processor, memory, storage, graphics adapter, interrupts, and so on. Although the emulation may increase the resources needed to execute a task, and may lower efficiency, as noted, the VM 315 provides other benefits, such as the execution of multiple operating system versions and high availability, among other features.

Each VM 315 may execute an operating system that supports a container environment. As used here, container environment refers to the system upon which the containers are executing. In the illustrated example, the container environment is the VM 315 and operating system executing on the VM 315. However, in other cases, the container environment may be a physical system such as the container server 310 itself and the operating system executing on that container server 310.

As noted, an operating system may support a container environment by having a kernel that has enabled operating-system-level virtualization for multiple isolated containers, along with additional resource management features, which limit the resources allocated to each isolated container. For example, for each container executing within the operating system, a kernel may limit the amount of resources (e.g., memory, processor cycles) provided to that container through the use of various resource management components of the operating system (e.g., thread priority, memory allocation, etc.).

In one embodiment, the kernel may be a Linux kernel, and may support resource isolation features such as chroot, cgroups, kernel namespaces, and union-capable file systems (e.g., aufs) in order to isolate each container. These features restrict each container's view of the operating system's resources. Instead, each app container may only see a set of virtual resources, such as the virtual resources 150. For example, an app container 320 may only be able to view file systems that are authorized for that app container 320. In one embodiment, the kernel may be a FreeBSD kernel, and the operating-system-level virtualization functions may be implemented in a "jail" system call. Compared to virtual machines, operating-system-level virtualization does not incur an emulation overhead, do not require a separate disk image for each container, are more resource-efficient as dedicated resources do not need to be allocated per container, may be more efficiently threaded, and so on. However, the container may still execute within a VM. Although the container environment is described here as executing within a VM 315, in another embodiment the container environment executes directly on the hardware of the container server 310.

The virtual switch 335 may emulate a hardware switch in software, and may be similar to the virtual switch 152. In a packet-switched environment, a hardware switch receives packets with an indicated destination network address and routes these packets to an output port which is connected to a path on which the destination with the destination network address exists. The hardware switch also may support various management interfaces and protocols (e.g., quality of service (QoS). Similarly, the virtual switch 335 may provide functions that are similar to the above-described hardware switch, but instead of being implemented in hardware, the virtual switch 335 may be implemented in software (or in a hybrid software/hardware implementation). For example, the virtual switch 335 may route communications arriving at the container server 310 or VM 315 to the correct container or other service within the container server 310 or VM 315. As another example, the virtual switch 335 may route communications between containers of the same container server 310 or VM 315. The virtual switch 335 performs the routing using the network addresses of each container executing within the container server 310. While the virtual switch 335 is shown to be part of the VM 315 in the illustrated embodiment, in another embodiment the virtual switch 335 may be part of the hypervisor 340 or the VM 315 and the hypervisor 340 may each have a virtual switch.

The container service 330 is a collection of services to assist with the deployment and execution of containers on the VMs 315, and may be similar to the container service 170. Although two container services 330A and 330B are illustrated, they perform similar functions and are described together here. The container service 330 may include an application programming interface (API) for the use of software developers creating containerized software. The API may allow a software developer to easily create a containerized software application without having to implement operating system and operating system version specific functions, which are instead implemented by the container service 330. For example, the container service 330 may offer API function calls that may be used by a container to perform certain functions related to creating a container. The container service 330 may manage the isolation of resources for each container. These resources may include filesystem resources (e.g., system libraries), user and user groups, process trees (e.g., viewable processes), network resources, device resources, and inter-process communication resources (e.g., semaphores). The container service 330 may perform the isolation through the use of permissions restrictions, disk quotas, central processor unit (CPU) scheduling, input/output (I/O) scheduling, counters (e.g., beancounters), and so on.

The API of the container service 330 also may include functions to allow for a software developer to easily deploy containers on multiple hardware platforms in a distributed fashion, and for each container to be able to share data with other containers in a seamless fashion. For example, the container service 330 may allow one container to be able to access a same shared pool of data as another container through a standard API, without the need to manage the memory space directly.

The container service 330 also may be able to combine multiple container servers 310 or other hardware platforms into a single virtual host (e.g., a clustered host). The container service 330 also may include extensions to allow for easy integration with cloud services providers, such that a software developer may easily deploy a containerized application to one of these cloud services. Examples of container services include Docker®, Kubernetes®, and so on.

After receiving a request from an app container 320 (e.g., via the API), the container service 330 may also create a connection between the app container 320 and the virtual switch 335. This connection includes a port pair, with one port connected to the virtual switch 335, and the other pair connected to the app container 320. This connection also may include the network hardware layer address (e.g., media access control (MAC) address) and network address (e.g., Internet Protocol (IP) address) for the app container 320. This information provides the app container 320 with its own network address and isolated network path. The connection may be used by the app container 320 to route to other containers or destinations that are connected to network 390. The container service 330 also may provide the connection as a tunneled connection.

The app container 320 is a containerized software application executing in the container system 305, and may be similar to the app containers 104 of FIG. 1. In the illustrated embodiment of FIG. 3, the app container 320 is executing in the VM 315. However, in other embodiments, the app container 320 may execute directly on the container server 310 (via the operating system level virtualization of the container system 315) and not within a VM. Although two app containers 320A-B are shown here, in other embodiments each VM 315 (or container server 310) may have multiple app containers. The app container 320 may include any executable code as created by a software developer. The app container 320 may include a network interface to communicate with other entities in the network 390 via the virtual switch 335. As noted, each app container 320 may be isolated from other app containers 320. Each app container 320 may thus be in its own "domain." As noted, these domains may be created using different method of operating-system-level virtualization, such as through the use of namespaces (e.g., Linux namespaces).

In one example embodiment, the app container 320 may be stored as one or more images that include the executable code and other data for the containerized software application of the app container 320. Each image in the app container 320 may include updates and changes to the software application. These images may be part of a union file system, and may be joined together by the container service 330, along with a base image, in order to generate the complete application package. The running app container 320 comprises this complete application package. An additional read-write layer also may be added by the container service 330 to the running app container 320, as the images are read only.

The security container 350 may intercept communications from the app containers 320 for network security monitoring. In one embodiment, the security container 350 includes the functions of the intercept container 120 of FIG. 1. As noted above, in a typical containerized environment, the container service 330 facilitates the connection of an app container 320 to the network 390. This connection may also be tunneled using an encryption protocol (e.g., secure sockets layer (SSL)). Due to this type of connection, intercepting the traffic of the app container 320 transparently is challenging. Furthermore, each container is self-contained, and as noted above, may be packaged as a read-only image. Thus, modifying the app container itself also may be undesirable.

Instead, the security container 350 monitors the VM 315 (or container server 310 if the container environment is the container server 310 itself) to determine if any new app containers 320 are created. To monitor the container environment, the security container 350 may communicate with the container service 330 or request for and/or be given special administrative rights that allow it to query or determine the processes executing on the VM 315. When the security container 350 determines that a new app container 320 is created and connected to the virtual switch 335, the security container 350 may intercept the network traffic of the new app container 320 by moving the connection between the virtual switch 335 and the new app container 320 such that the connection may be made between the virtual switch 335 and the security container 350 instead. The security container 350 also may create a new connection between the new app container 320 and the security container 350. The security container 350 may also save and recover any existing routing entries during this process.

After performing this intercept operation, network traffic to and from the new app container 320 flows through the security container 350. The security container 350 may be able to monitor this traffic and inspect it to determine if a network security issue exists. The security container 350 may perform various actions on the traffic, such as forwarding it, making a copy of it, and so on. In the case where the security container 350 includes the functions of the intercept container 120 of FIG. 1, the security container 350 also determines if any intercepted data violates any policies. This allows the security container 350 to prevent loss of sensitive data, to determine if there are any undesired activities within the container system 305, and so on. Because the security container 350 sits within the container environment, it can have special privileges and be able to view inside the app containers, as opposed to an external security device. Although a single security container 350 is illustrated, the container system 305 may include multiple security containers 350 clustered together.

The container system 305, in one embodiment, also includes an analytics container 360 to analyze information received from the security containers 350. The analytics container 360 may request or receive longs and statistics from the security containers 350 regarding intercepted network traffic and other data. The analytics container 360 may analyze this information to produce various results. For example, the analytics container 360 may determine whether a denial of service attack is occurring within some of the application containers 320. The analytics container 360 may also forward the information and analytical results to the management container 355. The container system 305 may include multiple analytics containers 360 to allow for redundancy and high availability.

The container system 305, in one embodiment, also includes one or more management containers 355 for configuration and monitoring of the security containers 350 in the container system 305. The management container 355 may configure the settings and rules for the security containers 350 and the analytics container 360 in the container system 305. For example, these rules may indicate what type of network traffic to log or to filter out. The management container 355 monitors the activities of other management containers 355 and the security containers 350. Activities monitored may include start/stop activities, statistics, and so on. The management container 355 may also listen for reports and other information from the analytics container 360. Additionally, the management container 355 may receive instructions from the user interface (UI) container 365 regarding the configuration of rules in the security containers 350 and other options. Furthermore, the management container 355 may also present the reports and other information collected by the security containers 350 and analytics containers 360 to a user via the UI container 365. The container system 305 may include multiple management containers 355 to allow for redundancy and high availability.

The container system 305, in one embodiment, also includes a user interface (UI) container 365 to provide a user interface to a user. The UI container 365 may interface with a user using a graphical user interface (GUI) or a command line interface (CLI). As noted above, the UI container 365 communicates with the management container 355 and via the user interface the UI container 365 may indicate to the management container 355 the various configuration options requested by a user. The UI container 365 may also receive information, such as various analytical reports, statistics, and other data from the management container 355. If the interface is a GUI, the interface may be presented using various GUI elements, such as drop down menus, tables, and so on, and may be interfaced using interface devices such as a mouse and touchscreen. The UI container 365 may also present the data received from the management container 355 using various graphical presentation schemes, such as a scatterplot, table, graph, and so on.

Example Flows

Figure 4:
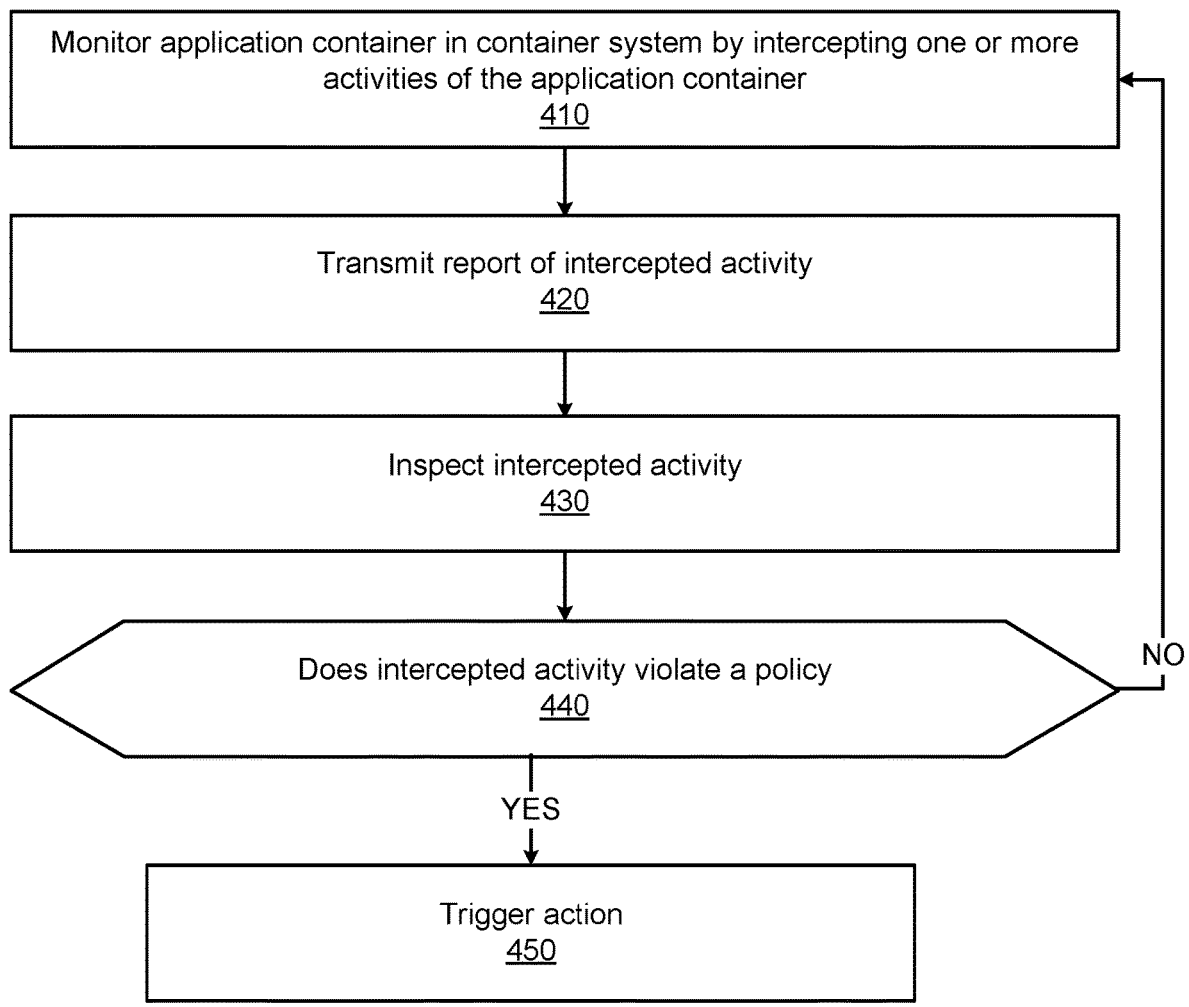
FIG. 4 is a flow chart illustrating an exemplary method for intercepting the traffic of an app container, according to one embodiment.

FIG. 4 is a flow chart illustrating an exemplary method 400 for intercepting the traffic of an app container, according to one embodiment. In one embodiment, FIG. 4 attributes the steps of the method 400 to the intercept container 120. However, some or all of the steps may be performed by other elements (e.g., the security container 350, another agent, a sidecar container, an agent executing inside an app container, etc.). In addition, some embodiments may perform the steps in parallel, perform the steps in different orders, or perform different steps. Also, it is noted that in one example embodiment the steps and/or modules may be embodied as instructions, e.g., instructions 524, that may be executed by the processor 502 described with respect to FIG. 5.

The intercept container 120 monitors 410 an app container, such as app container 104, in a container system (e.g., container system 102) by intercepting one or more activities of the app container. The activity may include data and/or metadata.

The intercept container 120 transmits 420 a report of the intercepted activity. The report may include information about data and metadata that was captured from the app container.

The intercept container 120 inspects 430 the intercepted activity to see if the captured data and/or metadata matches a template in a policy.

The intercept container 120 determines 440 if a policy is violated, i.e., if a template is matched within a policy when comparing to the intercepted activity. If so, execution moves to 450, where the intercept container 120 triggers an action specified by the policy. For example, if sensitive user data is detected in network activity for an app container to an external destination, this detection may match a template in a policy. The prescribed action for that policy may be to block this network activity. Therefore, the intercept container 120 may block the transmission of the sensitive user data in the network. If no policy is violated, execution continues back to 410, where the intercept container 120 continues to monitor the app container.

Example Machine Architecture

Figure 5:
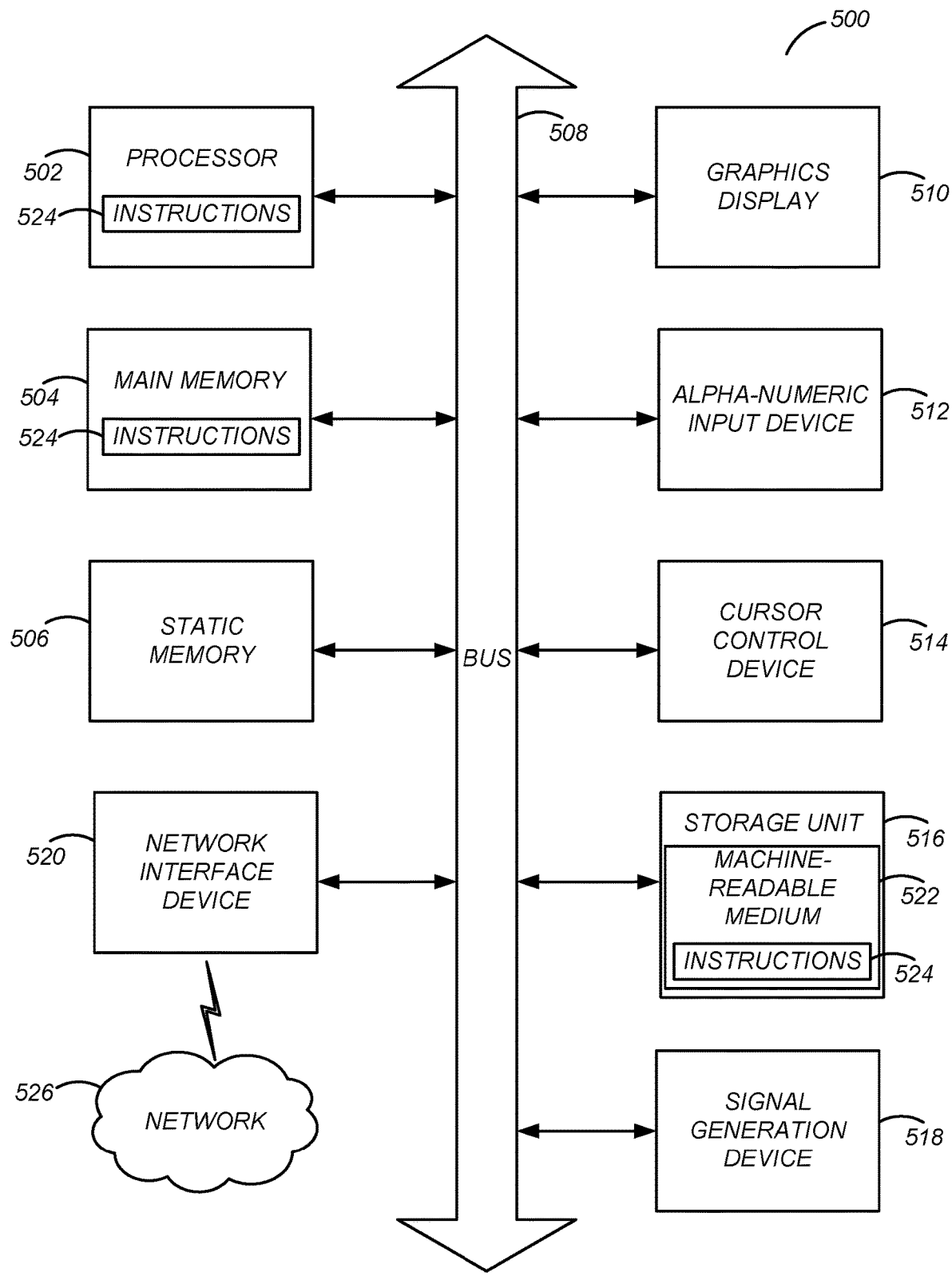
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 500 is used to execute the processes and functionality described in FIGS. 1-4.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASIC s), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to transparently monitor the security of a containerized system without having to intrude upon every single application container.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 624) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 502 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 504). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for transparent network security monitoring in a container environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
    intercepting network activity of an application container of a plurality of application containers of a container system by an intercept container of the container system, wherein the plurality of application containers share a single kernel of an operating system and are isolated from each other via operating system-level virtualization that is enabled by the single kernel, and wherein the application container is attempting to transmit a file to a network destination outside of the container system, and wherein a content of the file is obfuscated outside of the application container;
    accessing by the intercept container unobfuscated content of the file that corresponds to the network activity using an encryption key accessed from the application container using the single kernel, wherein the encryption key is obtained from a process monitor of the intercept container, which retrieves the encryption key by a scan inspection of a memory of the application container;
    inspecting the unobfuscated content by the intercept container;
    applying by the intercept container one or more regular expressions representing patterns of sensitive personal data to the unobfuscated content using the single kernel to determine whether the one or more regular expressions match the unobfuscated content;
    in response to the determining that the one or more regular expressions match the unobfuscated content, determining by the intercept container that the network activity is an attempt to transmit sensitive personal data out of the application container; and
    in response to the attempt to transmit the sensitive personal data out of the application container, triggering by the intercept container an action specified in a policy of the container system.

2. The method of claim 1, wherein the network activity is associated with providing network data from the application container to a virtual switch of the container system.

3. The method of claim 1, wherein the single kernel enables a plurality of containers sharing the single kernel, the plurality of containers includes the application container and the intercept container.

4. The method of claim 1, further comprising:
    intercepting file system activity from the application container; and
    capturing data written to and read from a virtual storage of the container system from the file system activity that has been intercepted.

5. The method of claim 4, wherein the intercepting file system activity further comprises:
    intercepting system call requests from the application container.

6. The method of claim 1, further comprising:
    transmitting a report that is a graphical interface presented on a web page by a web server, the report discussing the network activity.

7. The method of claim 1, further comprising:
    intercepting file system calls made by the application container to a virtual storage associated with the application container.

8. The method of claim 1, wherein the sensitive personal data comprises credit card information, a social security number, or a combination thereof.

9. A container system, comprising:
a processor that, when executing instructions stored in any associated memory, is configured to:
implement a plurality of application containers of the container system, wherein the plurality of application containers share a single kernel of an operating system and are isolated from each other via operating system-level virtualization that is enabled by the single kernel of the operating system; and
implement an intercept container that is enabled by the single kernel of the operating system and shares the single kernel with an application container of the plurality of application containers, wherein the intercept container is configured to:
intercept network activity of the application container attempting to transmit a file to a network destination outside of the container system, wherein a content of the file is obfuscated outside of the application container,
access unobfuscated content of the file that corresponds to the network activity using an encryption key accessed from the application container using the single kernel, wherein the encryption key is obtained from a process monitor of the intercept container, which retrieves the encryption key by a scan inspection of a memory of the application container,
inspect the unobfuscated content,
apply one or more regular expressions representing patterns of sensitive personal data to the unobfuscated content using the single kernel to determine whether the one or more regular expressions match the unobfuscated content,
in response to a determination that the one or more regular expressions match the unobfuscated content, determine that the network activity is an attempt to transmit sensitive personal data out of the application container,
in response to the attempt to transmit the sensitive personal data out of the application container, trigger an action specified in a policy of the container system.

10. The container system of claim 9, wherein the network activity is associated with providing network data from the application container to a virtual switch of the container system.

11. The container system of claim 9, wherein the single kernel enables a plurality of containers sharing the single kernel, the plurality of containers includes the application container and the intercept container.

12. The container system of claim 9, wherein the intercept container is further configured to:
intercept file system activity from the application container, and
capture data written to and read from a virtual storage of the container system from the intercepted file system activity that has been intercepted.

13. The container system of claim 12, wherein, when the intercept container intercepts the file system activity, the intercept container is further configured to intercept system call requests from the application container.

14. The container system of claim 9, wherein the intercept container is further configured to:
transmit a report regarding the network activity to a graphical interface of a user device.

15. The container system of claim 9, wherein the intercept container is further configured to:
intercept file system calls made by the application container to a virtual storage associated with the application container.

16. The container system of claim 9, wherein the sensitive personal data comprises credit card information, a social security number, or a combination thereof.

17. A non-transitory computer-readable storage medium configured to store instructions that, when executed by a processor of a container system, cause the processor to:
intercept network activity of an application container of a plurality of application containers of the container system by an intercept container of the container system, wherein the plurality of application containers share a single kernel of an operating system and are isolated from each other via operating system-level virtualization that is enabled by the single kernel and wherein the application container is attempting to transmit a file to a network destination outside of the container system, and wherein a content of the file is obfuscated outside of the application container; and
access unobfuscated content of the file that corresponds to the network activity using an encryption key accessed from the application container using the single kernel, wherein the encryption key is obtained from a process monitor of the intercept container, which retrieves the encryption key by a scan inspection of a memory of the application container;
inspect the unobfuscated content; and
apply by the intercept container one or more regular expressions representing patterns of sensitive personal data to the unobfuscated content using the single kernel to determine whether the one or more regular expressions match the unobfuscated content;
in response to a determination that the one or more regular expressions match the unobfuscated content, determine by the intercept container that the network activity is an attempt to transmit sensitive personal data out of the application container; and
in response to the attempt to transmit the sensitive personal data out of the application container, trigger an action specified in a policy of the container system by the intercept container.

18. The non-transitory computer-readable storage medium of claim 17, wherein the network activity is associated with providing network data from the application container to a virtual switch of the container system.

19. The non-transitory computer-readable storage medium of claim 17, wherein the single kernel enables a plurality of containers sharing the single kernel, the plurality of containers includes the application container and the intercept container.

20. The non-transitory computer-readable storage medium of claim 17, wherein the instructions further cause the processor to:
intercept file system activity from the application container, and
capture data written to and read from a virtual storage of the container system from the intercepted file system activity that has been intercepted.

21. The non-transitory computer-readable storage medium of claim 20, wherein when the intercept container intercepts the file system activity, the intercept container is further configured to intercept system call requests from the application container.

22. The non-transitory computer-readable storage medium of claim 17, wherein the instructions further cause the processor to:
intercept file system calls made by the application container to a virtual storage associated with the application container.

23. The non-transitory computer-readable storage medium of claim 17, wherein the sensitive personal data comprises credit card information, a social security number, or a combination thereof.

\* \* \* \* \*